W. T. RYAN.
SHEAR TABLE.
APPLICATION FILED MAR. 16, 1914.

1,150,541.

Patented Aug. 17, 1915.
5 SHEETS—SHEET 4.

WITNESSES

INVENTOR
W. T. Ryan
his Attorneys

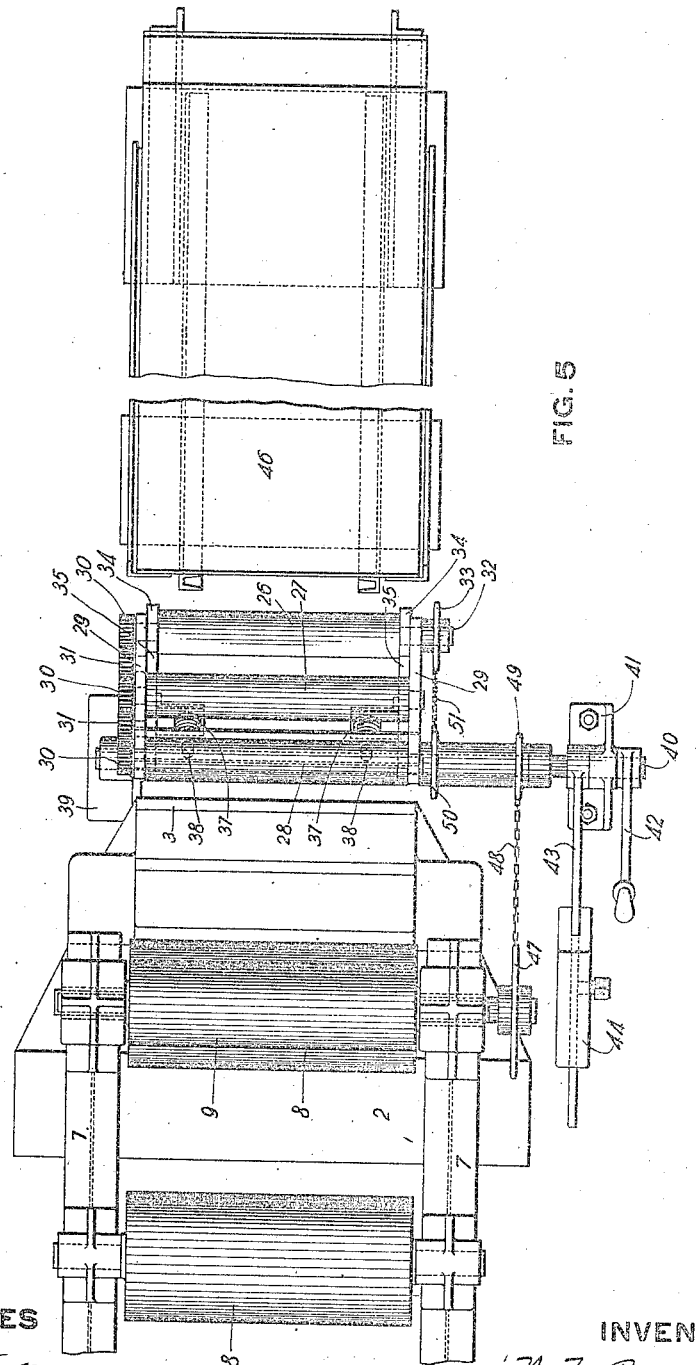

UNITED STATES PATENT OFFICE.

WINFRED T. RYAN, OF VANDERGRIFT, PENNSYLVANIA, ASSIGNOR TO AMERICAN SHEET AND TIN PLATE COMPANY, OF PITTSBURGH, PENNSYLVANIA, A CORPORATION OF NEW JERSEY.

SHEAR-TABLE.

1,150,541.

Specification of Letters Patent.

Patented Aug. 17, 1915.

Application filed March 16, 1914. Serial No. 824,977.

*To all whom it may concern:*

Be it known that I, WINFRED T. RYAN, a citizen of the United States, residing at Vandergrift, in the county of Westmoreland and State of Pennsylvania, have invented a new and useful Shear-Table, of which the following is a specification.

My invention relates to apparatus used in conjunction with metal cutting shears employed to sever multiple length sheet and tin bars and similar materials into short pieces in handling the sheared materials and in supporting the rear end of the multiple length pieces of the materials being sheared.

One object of my invention is to provide a shear receiving table of novel construction having improved means for transferring and delivering short pieces of the materials being sheared between the shear knives into position to be cut by the shears, and for supporting such materials during the shearing operations.

Another object of the invention is to provide a shear receiving table having novel means whereby the end of a multiple length blank projecting beyond the shear knives is yieldingly supported while moving into position to be cut and during the shearing operation.

A further object of this invention is to provide a shear receiving table having novel means for supporting the materials to be sheared and for moving the sheared materials, after the shearing operations, from in front of the knives of the shear.

Still further objects of my invention will appear hereinafter as the invention is more fully described and claimed.

Figure 1:
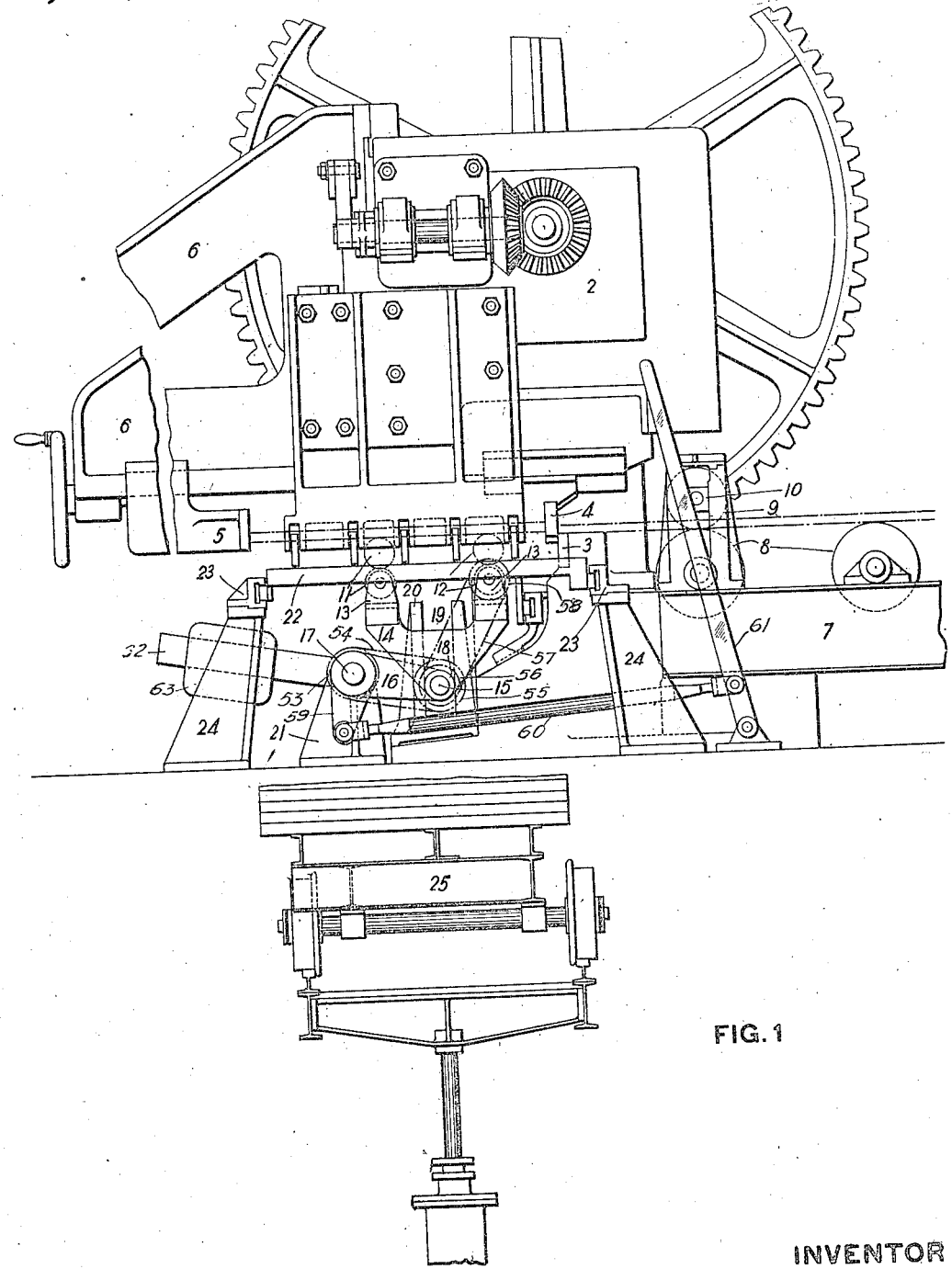
Figure 2:
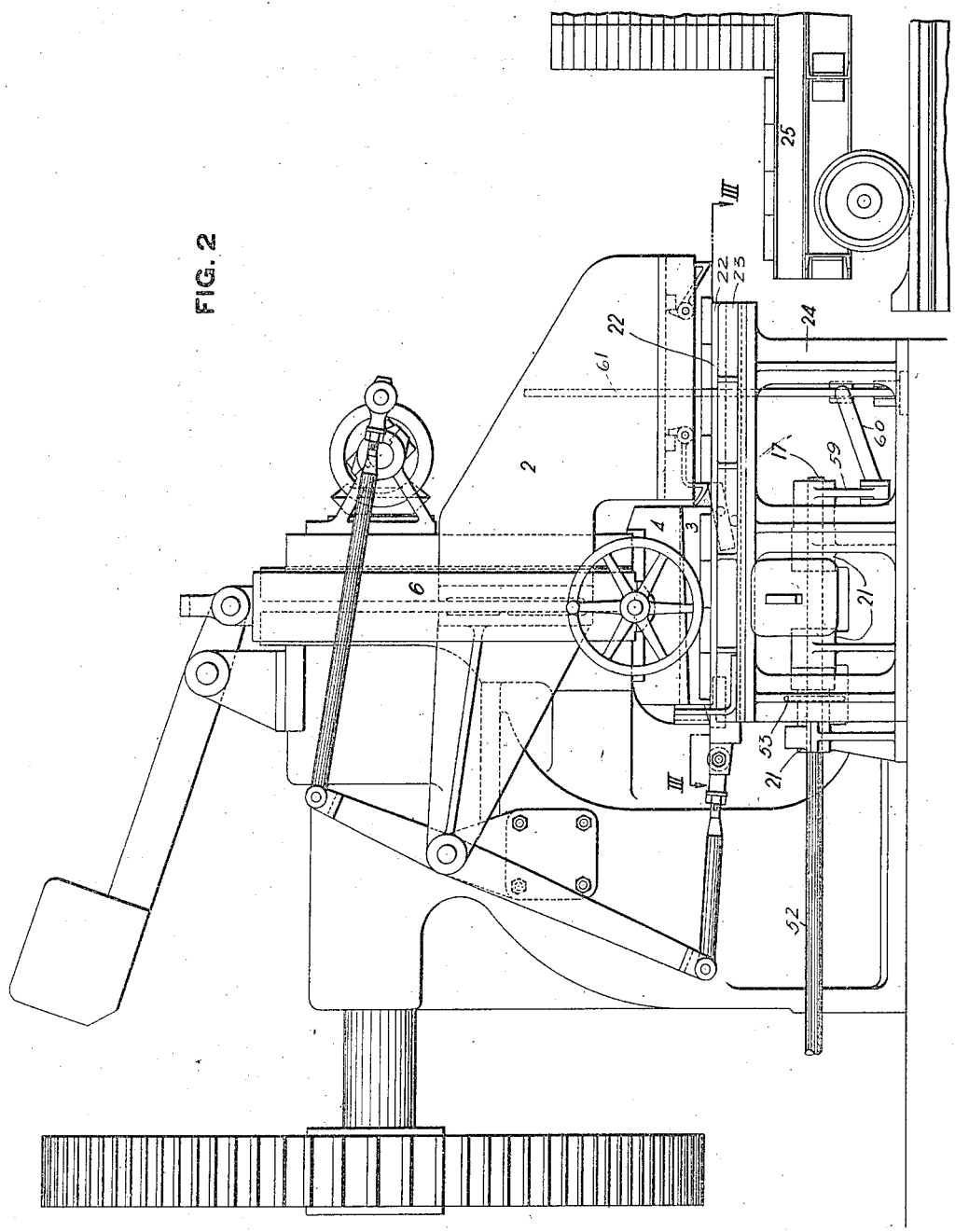
Figure 3:
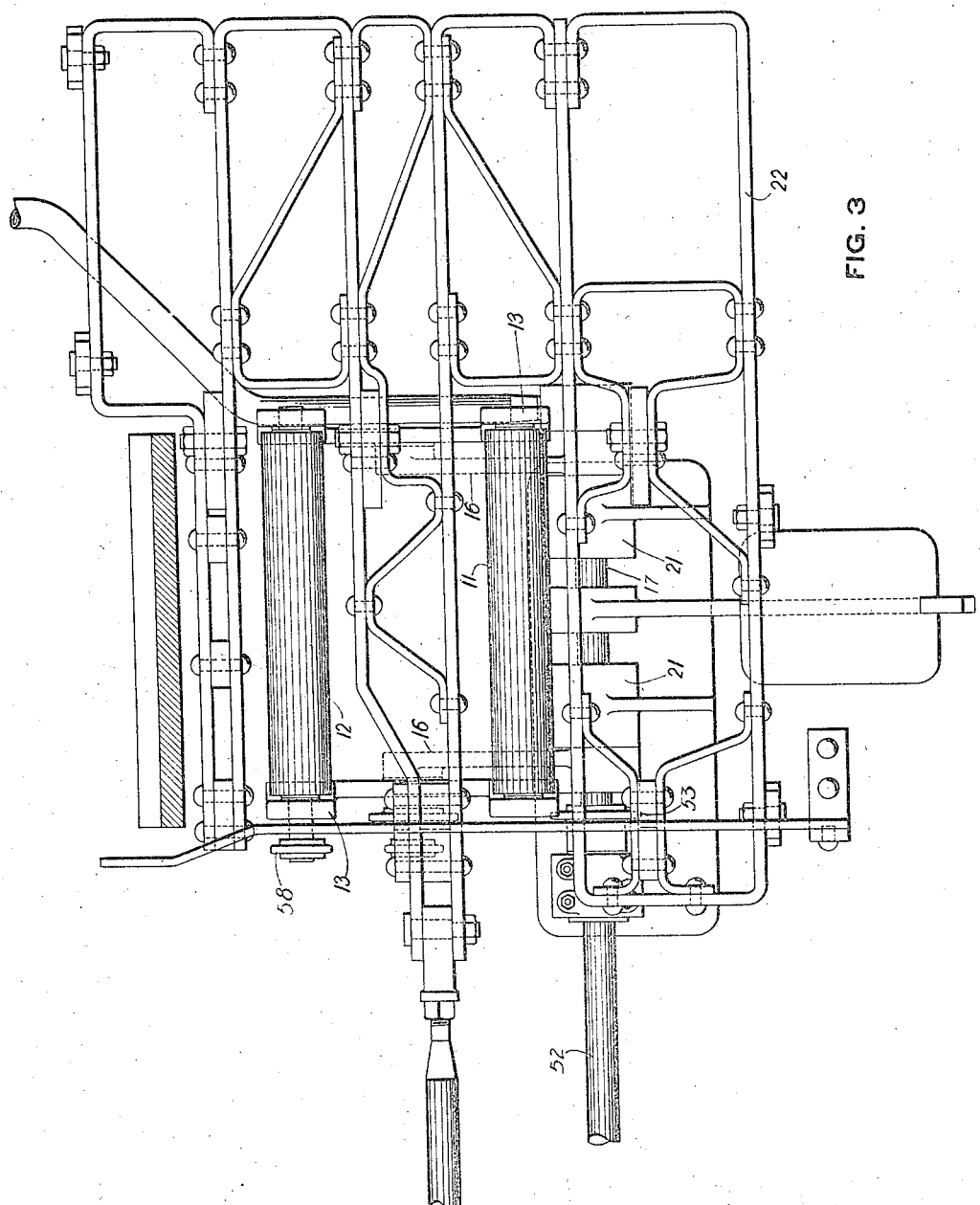
Figure 4:
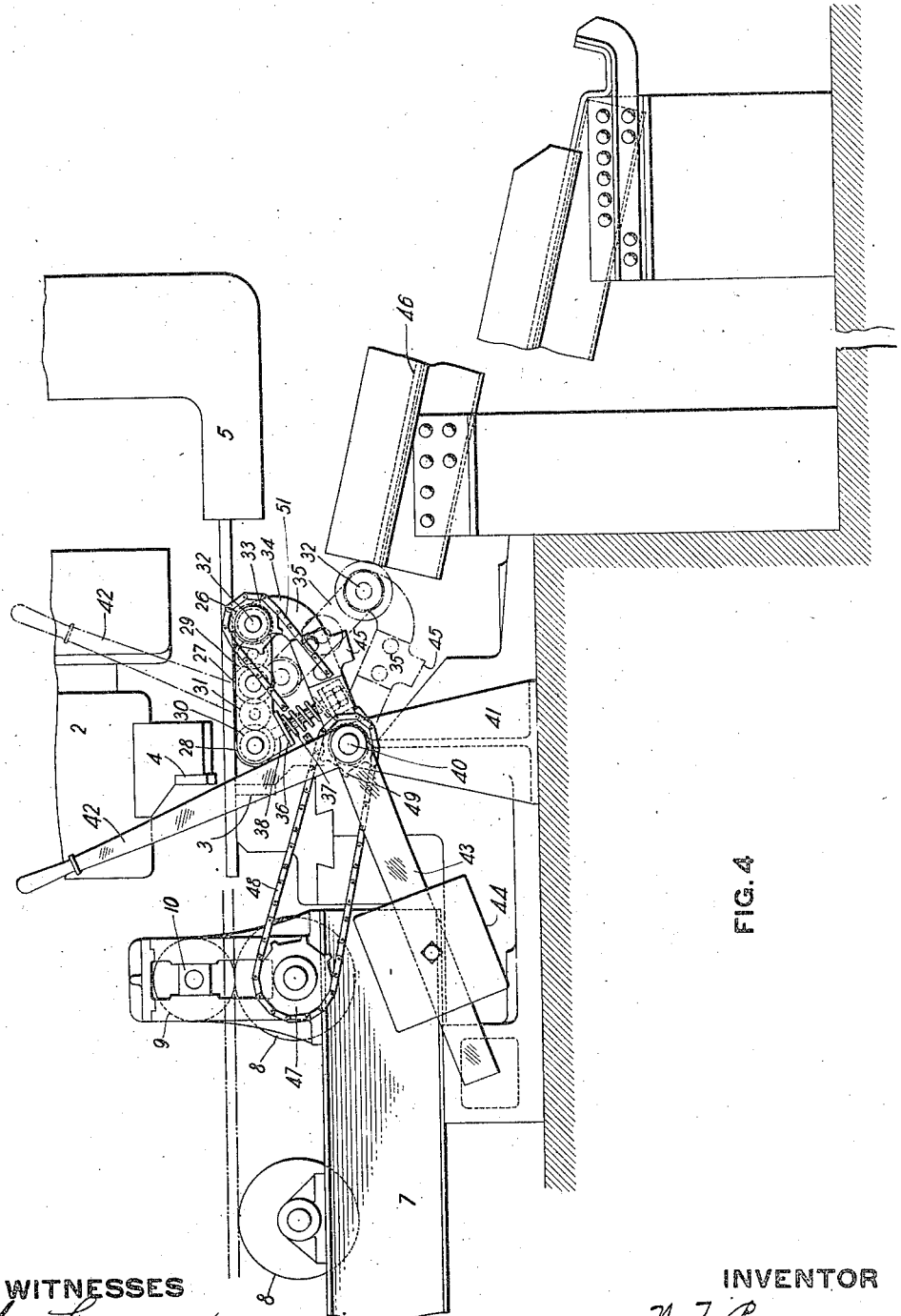

Referring to the drawings forming part of this specification, Figure 1 is a side elevation showing a bar shear having a shear table constructed and applied for use therewith in accordance with my invention. Fig. 2 is an end elevation of the apparatus illustrated in Fig. 1 and Fig. 3 is a sectional plan taken on the line III—III of Fig. 2. Fig. 4 is a side elevation showing a modified form of shear table as constructed and arranged and applied for use in connection with a shear in accordance with my invention, and Fig. 5 is a plan of the apparatus shown in Fig. 4.

In the accompanying drawings, in which like parts have similar numerals applied thereto, the numeral 2 designates a shear having a stationary bottom shear knife 3 and a power driven vertically reciprocating top knife 4 between which the materials to be severed are delivered lengthwise into engagement with the shear stop or gage 5 located in front of the shear. The gage 5 is suspended from or mounted upon a horizontally extending arm 6, being adjustable thereon toward and away from the shear knives to vary the length into which the severed materials are cut by the shear.

At the rear of the shear 2 is a feed table 7 having a series of positively driven feed rollers 8 upon or by which the materials to be severed are delivered from the rolling mill or place of storage, to the shear and between the shear knives 3 and 4 into engagement with the stop or gage 5.

Adjacent to the discharge end of the feed table 7 and operating in conjunction with the end roller 8 of the feed table 7 is an idler roller 9, these two rollers forming a pair of pinch rollers by which short lengths of materials to be cut are fed between the shear knives 3 and 4 into engagement with the shear gage 5. The pinch roller 9 is mounted in vertically movable bearings 10, 10, above the end roller 8 which is positively driven by the line shaft of the feed table 7 in the usual known manner.

In the apparatus shown by Figs. 1, 2 and 3, and also in the modified form of apparatus shown in Figs. 4 and 5, a receiving roller table is employed having at least one positively driven roller, this roller table being located on the front side of the shear, between the shear knives and the shear gage 5 in position to engage with and feed, as well as assist the pinch rollers in feeding, materials to be cut into engagement with the shear stop or gage.

Referring now to the construction shown in Figs. 1, 2 and 3 of the drawings, it will be seen that the receiving table comprises two feed rollers 11 and 12 mounted in bearings 13. The bearings 13 are secured to the upper ends of the forked members forming the sides 14 of the table, and the lower end of the sides 14 are pivotally connected by the shaft 15 to one end of the rocking arms 16 which are keyed or otherwise secured to the rock shaft 17. A guide 18 between the sides 14 of the table projects into the opening 19 in the slide 20 to cause the rollers 11 and 12 to move vertically in parallel lines and the rock shaft 17 is mounted in bearings 21 beneath the rollers 11 and 12. Positioned at one end of the rock shaft 17 to be axially central therewith is a driving shaft 52 which preferably is operatively connected to and driven by the shear operating mechanism. On one end of the shaft 52 is a sprocket wheel 53 connected by the sprocket chain 54 with the sprocket wheel 55 on the pivot shaft 15, and also mounted on this shaft 15 is a second sprocket wheel 56, which is connected to and rotated by the wheel 55. The wheel 56 is connected by the sprocket chain 57 to the sprocket wheel 58 on one end of the shaft for the roller 12 so that when the shear driving mechanism is actuated the feed roller 12 is positively rotated. Keyed or otherwise fastened to one end of the rock shaft 17 is a swinging arm or lever 59 by which the shaft 17 is actuated in moving the rollers 11 and 12 into and out of their raised position (shown dotted in Fig. 1). The lower end of the arm 59 is connected by the reach rod 60 to the pivoted operating lever 61. A counterbalance lever 62 on the shaft 17, having a counterweight 63 thereon, is also provided to lessen the force necessary in manually operating the lever 61 to raise and lower the rollers 11 and 12. In the apparatus of Figs. 1, 2 and 3, a horizontally reciprocating table or carrier 22 is also used, this table being mounted on slides 23, 23, on the top of the stands 24, to receive the materials as sheared and transfer the sheared materials sidewise from in front of the shear knives and discharge such materials upon the car 25 located at one side of the shear 2 and the rollers 11 and 12 forming the receiving table. The table or carrier 22 and the car 25 upon which the cut materials are stacked in piles in the operation of the carrier, and by which the piled materials are taken away from the shear, forms subject matter of Patent No. 1,129,214, for a bar piler, issued February 23, 1915, to Howard G. McIlvried, and no claim to this apparatus is made herein.

In the modified form of apparatus shown in Figs. 4 and 5, the receiving table comprises a series of three positively driven feed rollers 26, 27 and 28, these rollers having shafts extending into the bearings formed in the sides 29, 29, of the receiving table. One end of the shafts for the rollers projects through the bearings in the side 29 of the table and has a spur gear 30 thereon. The gears 30 are operatively connected together by the idler spur pinions 31 and the shaft 32 for the roller 26 is provided with a sprocket wheel 33 through which the series of rollers 26, 27 and 28 are positively driven. The shaft 32 projects through its bearings in the sides of the receiving table into the bearings 34, 34, on one end of the pivoted arms 35 and the opposite end of the sides of the roller table engage with the follower plate 36 for the helical springs 37 which extend between the arms 35 to yieldingly support the pivoted table at one end on the arms. The springs 37 are secured upon the pivoted arms 35 by means of the bolts 38. Extending through the bearing 39 on the base of the shear 2 is a horizontal pivot shaft 40 on which the lever arms 35 are pivotally mounted, these arms being keyed to the shaft 40 so as to be rocked thereby. One end of the shaft 40 projects through the dead-eye bearing 41 which is positioned at one side of the shear, and a lever 42 having a handle on its upper end by which the roller table is tilted or rocked manually is fastened to the end of the shaft 40. The shaft 40 is also provided with a counterweight lever arm 43 having a counterweight 44 which is adjustably mounted thereon to counterbalance and hold the receiving roller table in its raised or lifted position, (shown by full lines in Fig. 5) to receive and support materials caused to project between the shear knives of the shear. Stops 45 are provided on one end of the pivoted lever arms 35 to limit, by engagement with the base of the shear 2, the downward swinging movement of the arms 35. Positioned at the discharge end of the receiving table is an inclined chute 46 which receives the sheared materials delivered thereto by the table and on which the sheared materials slide to the bottom thereof in position to be removed to the heating furnace or other place in which the sheared materials are used. The end feed roller 8 on the delivery table 7 is provided with a sprocket wheel 47 which is connected by a sprocket chain 48 with a sprocket wheel 49 loosely mounted on the pivot shaft, and formed integrally with the sprocket wheel 49 is a sprocket wheel 50 which is connected by the sprocket chain 51 with the sprocket wheel 33 on one end of the shaft 32 for the roller 26 of the tilting receiving table, so that when the sprocket wheel 47 rotates with the feed roller 8 of the delivery table 7 the roller 26 and, through the connecting spur gears 30 and 31, the rollers 27 and 28 of the tilting receiving table, are positively rotated.

It will be readily understood that any number of bars that can be fed forwardly between the shear knives can be cut simultaneously, the number being limited by the width of the shear knives and relative width of the materials being cut.

The operation of the apparatus shown in Figs. 1, 2 and 3 will now be described.

The long pieces of the materials to be severed are transferred lengthwise upon the rollers 8 of the delivery table 7 to the shear 2, and after cropping the front end of the materials, the cut end thereof is moved into engagement with the shear gage 5. This gage will have been adjusted and fixed on the arm 6 upon which it is adjustably mounted at the required distance from the shear knives to sever pieces of the desired length from the multiple length materials. Each time a relative approach of the shear knives is effected the reciprocating table 22, which is operatively connected to the shear operating mechanism, will move lengthwise forwardly and back so as to first transfer the sheared materials from in front of the shear, and in its backward movement, discharge the materials therefrom. In feeding the materials between the shear knives preparatory to cutting pieces therefrom, the pinch rollers formed by the positively driven end roller 8 of the delivery table and the roller 10 which operates in conjunction therewith, grip and assist in the lengthwise movement of the materials, especially after the multiple length materials, through successive cutting operations, are reduced to a comparatively short length. When successive cutting operations have reduced the length of the materials being sheared to less than the distance between the shear stop 5 and the end roller 8 of the delivery table 7 the materials projecting between the shear knives will rest upon the shear table, in such case the rollers 11 and 12 being lifted into the raised position shown by dotted lines in Fig. 1, by means of the manually operated hand lever 61. As the rollers 11 and 12 are positively driven through the sprocket chains 54, 57, and sprocket wheels 53 and 55, 56 and 58, the short pieces of materials are positively fed forwardly against the shear gage 5 and are held out of engagement with the bottom shear knife 3 and the top of the reciprocating table 22 during such forward movement. After the short pieces of material are moved into engagement with the shear gage the shear is actuated to cause the upper shear knife 4 to descend and cut such pieces to length. The hand lever 61 is then actuated to lower these cut materials upon the reciprocating table 22, and, through the connecting mechanism, the reciprocating table 22 is caused to move first forwardly and then backwardly, so as to first shift the position of the materials resting on this table from in front of the shear knives, and then discharge and deliver the cut materials therefrom upon the car 25, or other means for receiving the materials at the discharge end of the reciprocating table 22. The above described operations are then repeated with successive multiple length materials being sheared in the operation of the apparatus of Figs. 1, 2 and 3.

In the operation of the apparatus shown in Figs. 4 and 5 the multiple length materials to be sheared are moved lengthwise by the rollers 8, 8, of the delivery table 7 until the forward end of the materials to be cut project slightly beyond the shear knives. The crop end is then cut off the materials and the rollers of the delivery table 7 are rotated to advance the forward end of the materials being cut into engagement with the shear gage 5. The shear knife 4 is then caused to approach the knife 3 so as to sever the part of the materials projecting between the shear knives from the balance thereof which is supported on the rollers 8 of the delivery table. As the shear knives approach each other the severed material is caused to rest upon the rollers 26, 27, and 28, forming the receiving table. The lever arm 42 is then rocked manually, which tilts the rollers of the receiving table from the position shown by full lines into that shown by dotted lines in Fig. 4. At the same time the rollers 8, 8, of the delivery table on the rear of the shear are caused to again rotate and feed forwardly the material being sheared until the front end thereof is again projecting between the shear knives and in engagement with the gage 5. The rotation of the feed roller 8 through the sprocket chain 48 causes the sprocket wheels 49 and 50 to rotate and, through the sprocket chain 51 and sprocket wheel 33 on the shaft 32 for the roller 26, rotate this roller. The spur gears 30, 31 connecting the rollers 27 and 28 with the roller 26 cause these rollers to be rotated, and in this way the sheared materials are delivered from the receiving table into the upper end of the inclined chute 46 in which the materials slide to the lower end thereof in position to be removed. When by successive cutting operations the length of the materials being sheared is reduced to a length less than the distance between the end roller 8 of the delivery roller table 7 and the shear gage 5, the projecting end of materials of this length rests upon the rollers 26, 27, 28, of the feed or shear table, and the rotation of these rollers causes such short length materials to be fed forwardly into engagement with the shear gage. The upper shear knife is then caused to descend to cut such remaining portion of the materials into pieces of the desired length, a short piece forming a rear crop end usually remaining. The above described operations are then repeated with successive tin bars or series of tin bars in cutting the multiple length bars into bars of the desired length with the apparatus of Figs. 4 and 5.

The advantages of my invention will be apparent to those skilled in the art. By the use of my improved receiving table the materials to be cut are easily and quickly moved into position for cutting and are discharged from in front of the shear when cut. The apparatus is simple and is easily kept in repair.

Modifications in the construction and arrangement of the parts may be made without departing from my invention.

I claim:—

1. The combination with a shear having a gage, of a roller table on the discharge side thereof, having at least one positively driven feed roller, and a tilting support for the roller table arranged to lift and hold the roller table in position to receive and deliver materials projecting between the shear knives in engagement with the shear gage.

2. The combination with a shear having a gage, of a roller table on the discharge side of the shear having a positively driven feed roller, and a tilting support for the roller table arranged to lift and hold the table rollers in position to receive and deliver materials projecting between the shear knives into engagement with the shear gage.

3. The combination with a shear having a gage, of a roller table on the discharge side of the shear having at least one positively driven feed roller, a tilting support on which the roller table is mounted and means for yieldingly holding the table rollers in position on the tilting support to receive and deliver materials projecting between the shear knives into engagement with the shear gage.

4. The combination with a shear having a gage, of a roller table on the discharge side of the shear, a pivoted arm forming a support on which the shear table is pivotally mounted, and a counterweight on said arm whereby the roller table is yieldingly held in raised position.

5. The combination with a shear having a gage, of a roller table on the discharge side of the shear, a pivoted arm forming a support on which the roller table is pivotally mounted, a counterweight on said arm, and a lever whereby the pivoted arm is rocked.

6. The combination with a shear having a gage, of a roller table on the discharge side of the shear, a pivoted arm forming a support on which said roller table is pivotally mounted, and to which one end of the roller table is pivotally secured, yielding means connecting the opposite end of the roller table with said pivoted arm, and a counterweight on said arm whereby the roller table is yieldingly held in raised position.

7. The combination with a shear having a gage, of a roller table on the discharge side of the shear, a pivoted arm forming a support on which said roller table is pivotally mounted, and to which one end of the roller table is pivotally secured, yielding means connecting the opposite end of the roller table with said pivoted arm, a counterweight on said arm, and a lever whereby the pivoted arm is rocked to tilt the table rollers in discharging materials therefrom.

8. The combination with a shear having a gage, of a roller table on the discharge side of the shear having at least one positively driven feed roller, a tilting support, said support being arranged to lift and hold the roller table in position to receive and deliver materials projecting between the shear knives into engagement with the shear gage, means for tilting the roller table to discharge sheared materials thereon, and an inclined chute arranged to receive sheared materials from the roller table.

9. The combination with a shear having a gage, of a roller table on the discharge side of the shear having at least one positively driven feed roller, a pivoted support, on which the roller table is pivotally mounted, means on the support for yieldingly holding the table rollers in position to receive and deliver materials projecting between the shear knives into engagement with the shear gage, and means for manually tilting the table support and table in discharging sheared materials from the roller table.

In testimony whereof, I have hereunto set my hand.

WINFRED T. RYAN.

Witnesses:
R. G. SCOTT,
LOTTIE L. UNCAPHER.